US012658372B2

(12) United States Patent
Yeon et al.

(10) Patent No.: US 12,658,372 B2
(45) Date of Patent: Jun. 16, 2026

(54) MULTILAYER CERAMIC CAPACITOR WITH PATTERNED ELECTRODES

(71) Applicant: SAMSUNG ELECTRO-MECHANICS CO., LTD., Suwon-si (KR)

(72) Inventors: Gyuho Yeon, Suwon-si (KR); Chaedong Lee, Suwon-si (KR); Seung Ah Kim, Suwon-si (KR); Chulseung Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 98 days.

(21) Appl. No.: 18/596,109

(22) Filed: Mar. 5, 2024

(65) Prior Publication Data

US 2024/0304390 A1 Sep. 12, 2024

(30) Foreign Application Priority Data

Mar. 8, 2023 (KR) ......................... 10-2023-0030513

(51) Int. Cl.
*H01G 4/248* (2006.01)
*H01G 4/224* (2006.01)
(Continued)

(52) U.S. Cl.
CPC ............. *H01G 4/248* (2013.01); *H01G 4/224* (2013.01); *H01G 4/2325* (2013.01); *H01G 4/30* (2013.01)

(58) Field of Classification Search
None
See application file for complete search history.

(56) References Cited

U.S. PATENT DOCUMENTS 5,821,627 A * 10/1998 Mori ...................... H05K 3/328
257/781
2015/0090483 A1 * 4/2015 Moon .................... H01G 4/232
29/25.42
(Continued)

FOREIGN PATENT DOCUMENTS

CN 112063345 A * 12/2020 ............. C09J 11/04
JP H08288174 A * 11/1996
(Continued)

OTHER PUBLICATIONS

Translation KR20190045748A (Year: 2019).*
(Continued)

*Primary Examiner* — Eric W Thomas
(74) *Attorney, Agent, or Firm* — Morgan, Lewis & Bockius LLP

(57) ABSTRACT

A multilayer ceramic capacitor includes a ceramic body having a preset size of length, width, and thickness, first and second external electrodes respectively including body portions covering both end portions spaced apart from each other in a length direction of the ceramic body and band portions extending from the body portions and covering portions of both side surfaces of the ceramic body in a width direction and portions of both side surfaces of the ceramic body in a thickness direction, a plurality of first and second internal electrodes alternately led out from both end portions of the ceramic body with a dielectric layer interposed therebetween and connected to the first and second external electrodes, respectively, and a patterned electrode partially covering one surface of the band portion in the thickness direction of the ceramic body.

7 Claims, 11 Drawing Sheets

(51) Int. Cl.
*H01G 4/232* (2006.01)
*H01G 4/30* (2006.01)

(56) References Cited

U.S. PATENT DOCUMENTS

| 2016/0336114 A1 | 11/2016 | Nishimura et al. |
| 2018/0151296 A1 | 5/2018 | Yamada |
| 2018/0323010 A1 | 11/2018 | Park et al. |
| 2019/0252121 A1 | 8/2019 | Park et al. |
| 2020/0051746 A1 | 2/2020 | Park et al. |
| 2021/0125783 A1 | 4/2021 | Onodera et al. |
| 2023/0119320 A1* | 4/2023 | Tamatani ............... H01F 27/29 361/540 |
| 2023/0162922 A1* | 5/2023 | Kokawa ................ H01G 4/012 361/301.4 |
| 2023/0337362 A1 | 10/2023 | Shi |

FOREIGN PATENT DOCUMENTS

| JP | 4641589 | B | 12/2010 |
| JP | 2012033652 | A | * 2/2012 |
| JP | 6915324 | B | 7/2021 |
| JP | 6932906 | B | 8/2021 |
| JP | 6933062 | B | 8/2021 |
| KR | 10-2015-0080775 | A | 7/2015 |
| KR | 10-2019-0045748 | A | 5/2019 |
| KR | 10-2019-0098016 | A | 8/2019 |
| WO | 2022/057504 | A1 | 3/2022 |

OTHER PUBLICATIONS

Translation CN 112063345 A (no date).*
Extended European Search Report dated Aug. 14, 2024, issued in corresponding European Patent Application No. 24160838.9.

* cited by examiner

MULTILAYER CERAMIC CAPACITOR WITH PATTERNED ELECTRODES

CROSS-REFERENCE TO RELATED APPLICATION

This application claims priority to and the benefit of Korean Patent Application No. 10-2023-0030513 filed in the Korean Intellectual Property Office on Mar. 8, 2023, the entire contents of which are incorporated herein by reference.

BACKGROUND

The present disclosure relates to a multilayer ceramic capacitor.

Electronic components using ceramic materials include capacitors, inductors, piezoelectric elements, varistors, or thermistors. Among these ceramic electronic components, multilayer ceramic capacitors (MLCCs) may be used in various electronic devices due to their small size, high capacitance, and ease of mounting.

For example, multilayer ceramic capacitors may be used in a chip-type condenser mounted in substrates in video devices, such as liquid crystal displays (LCDs), plasma display panels (PDPs), and organic light-emitting diodes (OLEDs) and various electronic products, such as computers, personal portable terminals, and smartphones to charge or discharge electricity.

After a multilayer ceramic capacitor is mounted on a substrate, a flex crack may occur when the substrate is deformed or vibrated. To solve this problem, soft terminations using epoxy are applied. Even in this case, an electrode layer may be easily peeled off, a deviation of equivalent series inductance (ESL) may increase, or an adhesion strength may be insufficient.

SUMMARY

The present disclosure attempts to provide a multilayer ceramic capacitor having a small deviation of equivalent series inductance (ESL).

The present disclosure also attempts to provide a multilayer ceramic capacitor having a reduced possibility of the occurrence of flex cracks.

The present disclosure also attempts to provide a multilayer ceramic capacitor having improved adhesion strength of external electrodes.

However, the problems to be solved by the embodiments of the present disclosure are not limited to the above problems and may be variously extended within the scope of the technical idea included in the present disclosure.

A multilayer ceramic capacitor according to an embodiment includes: a ceramic body having a preset size of length, width, and thickness; first and second external electrodes respectively including body portions covering both end portions spaced apart from each other in a length direction of the ceramic body and band portions extending from the body portions and covering portions of both side surfaces of the ceramic body in a width direction and portions of both side surfaces of the ceramic body in a thickness direction; a plurality of first and second internal electrodes alternately led out from both end portions of the ceramic body with a dielectric layer interposed therebetween and connected to the first and second external electrodes, respectively; and a patterned electrode partially covering one surface of the band portion in the thickness direction of the ceramic body.

The band portion may include an exposed surface that is a portion exposed by the patterned electrode, and a ratio of an area of the exposed surface to an area of the patterned electrode may be 1:2 or more and 1:4 or less.

The patterned electrode may include a body portion patterned electrode partially covering the body portion.

The patterned electrode may include an island-shaped pattern.

The patterned electrode may include a stripe-shaped pattern.

The stripe-shaped pattern may extend in the length direction of the ceramic body.

The stripe-shaped pattern may have a uniform width in the width direction of the ceramic body.

The stripe-shaped patterns may be arranged at regular intervals in the width direction of the ceramic body.

The multilayer ceramic capacitor may further include a plating layer covering the exposed surface and the patterned electrode, wherein an intermetallic compound (IMC) layer may exist at an interface between the plating layer and the exposed surface.

The patterned electrode may include a conductive epoxy resin.

The conductive epoxy resin may include copper (Cu), tin (Sn), or silver (Ag).

According to the multilayer ceramic capacitor of the embodiment, since the intermetallic compound layer is formed between the outer circumferential surface of the lower band portion of the external electrode and the plating layer, a deviation of equivalent series inductance may be reduced.

In addition, according to the multilayer ceramic capacitor of the embodiment, since the exposed surface of the lower band portion of the external electrode and the patterned electrode are dense, surface roughness is high, so that the adhesion strength may increase and the occurrence of flex cracks may decrease.

BRIEF DESCRIPTION OF THE DRAWINGS

FIG. 4 is a bottom view schematically illustrating the multilayer ceramic capacitor shown in FIG. 1.

FIG. 6 is a bottom view schematically illustrating a multilayer ceramic capacitor having patterned electrodes including island-shaped patterns.

DETAILED DESCRIPTION OF THE EMBODIMENTS

Figure 1:
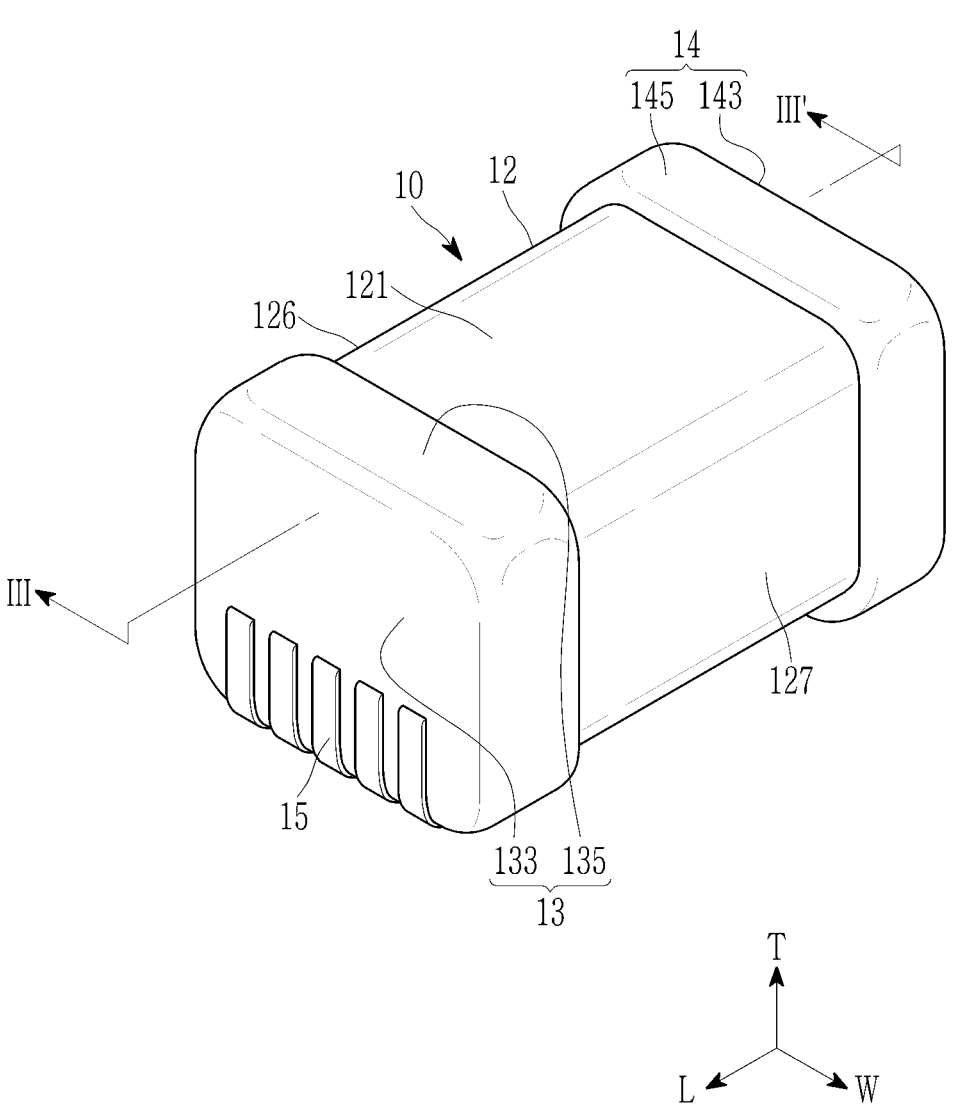
FIG. 1 is a perspective view schematically illustrating a multilayer ceramic capacitor according to an embodiment.

Hereinafter, embodiments of the present disclosure will be described in detail with reference to the accompanying drawings to allow those skilled in the art to practice the present disclosure. Portions unrelated to the description may be omitted in order to more clearly describe the present disclosure, and the same or similar components may be denoted by the same reference numerals throughout the present specification. In the accompanying drawings, some of the elements in the accompanying drawings are exaggerated, omitted, or schematically illustrated, and the size of each element does not entirely reflect the actual size.

The accompanying drawings of the present disclosure aim to facilitate understanding of the present disclosure and should not be construed as limited to the accompanying drawings. Also, the present disclosure is not limited to a specific disclosed form but includes all modifications, equivalents, and substitutions without departing from the scope and spirit of the present disclosure.

Terms including ordinals, such as first, second, etc., may be used to describe various elements but such elements are not limited to the above terms. The above terms are used only for the purpose of distinguishing one component from another.

Further, it will be understood that when an element, such as a layer, film, region, or substrate is referred to as being "above" or "on" another element, it may be "directly on" another element, or intervening elements may also be present. In contrast, when an element is referred to as being "directly on" another element, there are no intervening elements present. Further, when an element is "above" or "on" the reference portion, it may mean that the element is positioned above or below the reference portion, and it may not necessarily mean that the element is "above" or "on" toward an opposite direction of gravity.

Throughout the specification, the terms, such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded. Therefore, unless explicitly described to the contrary, the word "comprise," and variations, such as "comprises" or "comprising", will be understood to imply the inclusion of stated elements but not the exclusion of any other elements.

Throughout the specification, when it is referred to "in plain view," it means that a target element is viewed from above, and when it is referred to "in cross-sectional view", it means that a target element taken vertically is viewed from the side.

In addition, throughout the specification, when "connected", it may not only mean that two or more components are directly connected, but also that two or more components are indirectly connected through other components, physically connected, and electrically connected, or integrated although they are designated by different names depending on position or function.

Figure 2:
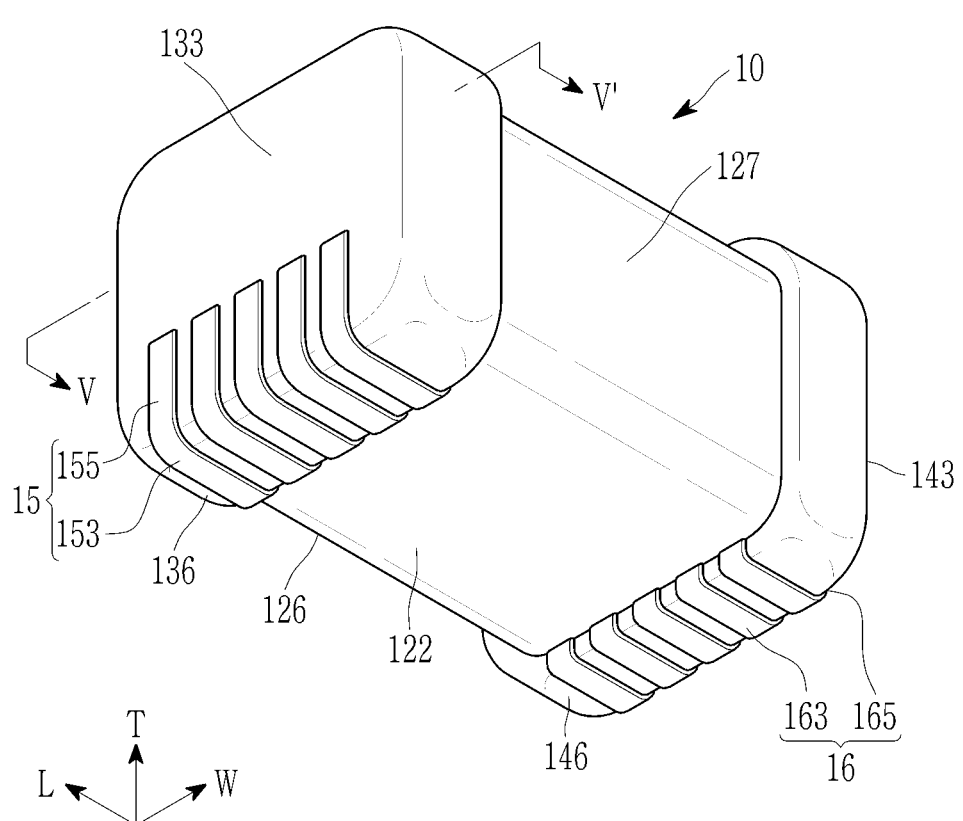
FIG. 2 is a bottom perspective view schematically illustrating the multilayer ceramic capacitor shown in FIG. 1.
Figure 3:
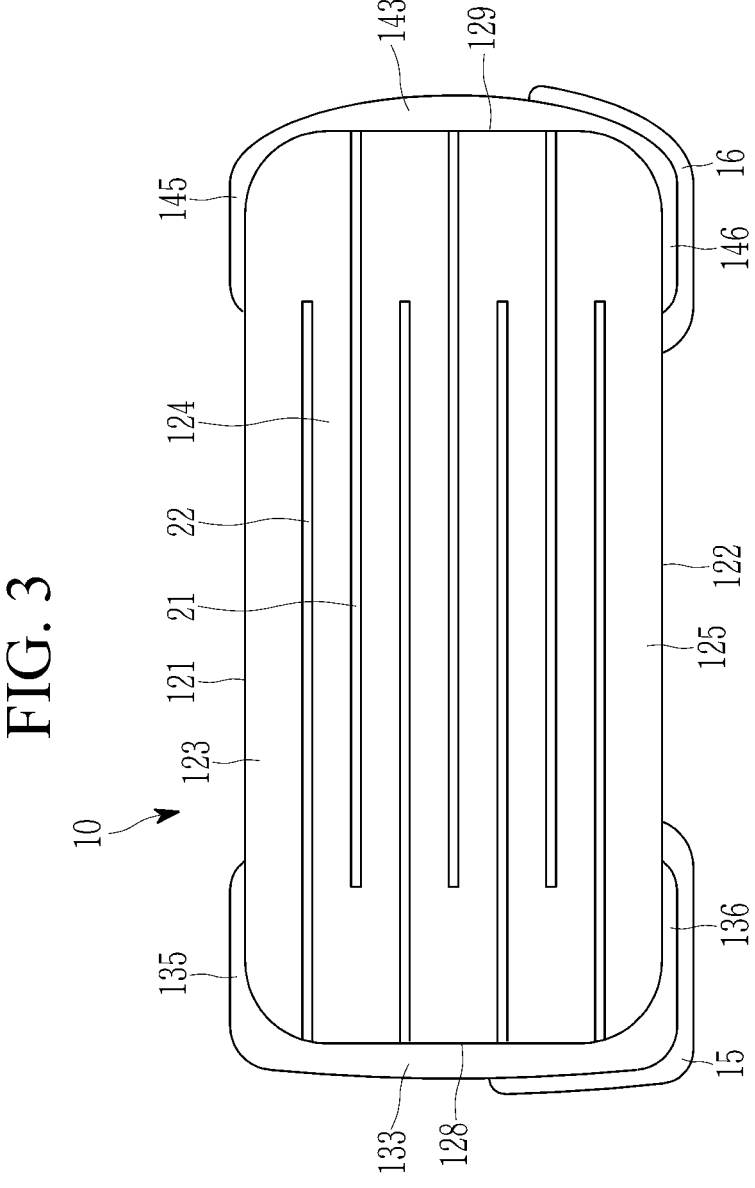
FIG. 3 is a cross-sectional view taken along line III-III' of FIG. 1.
Figure 3:
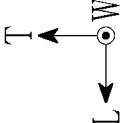
Figure 4:
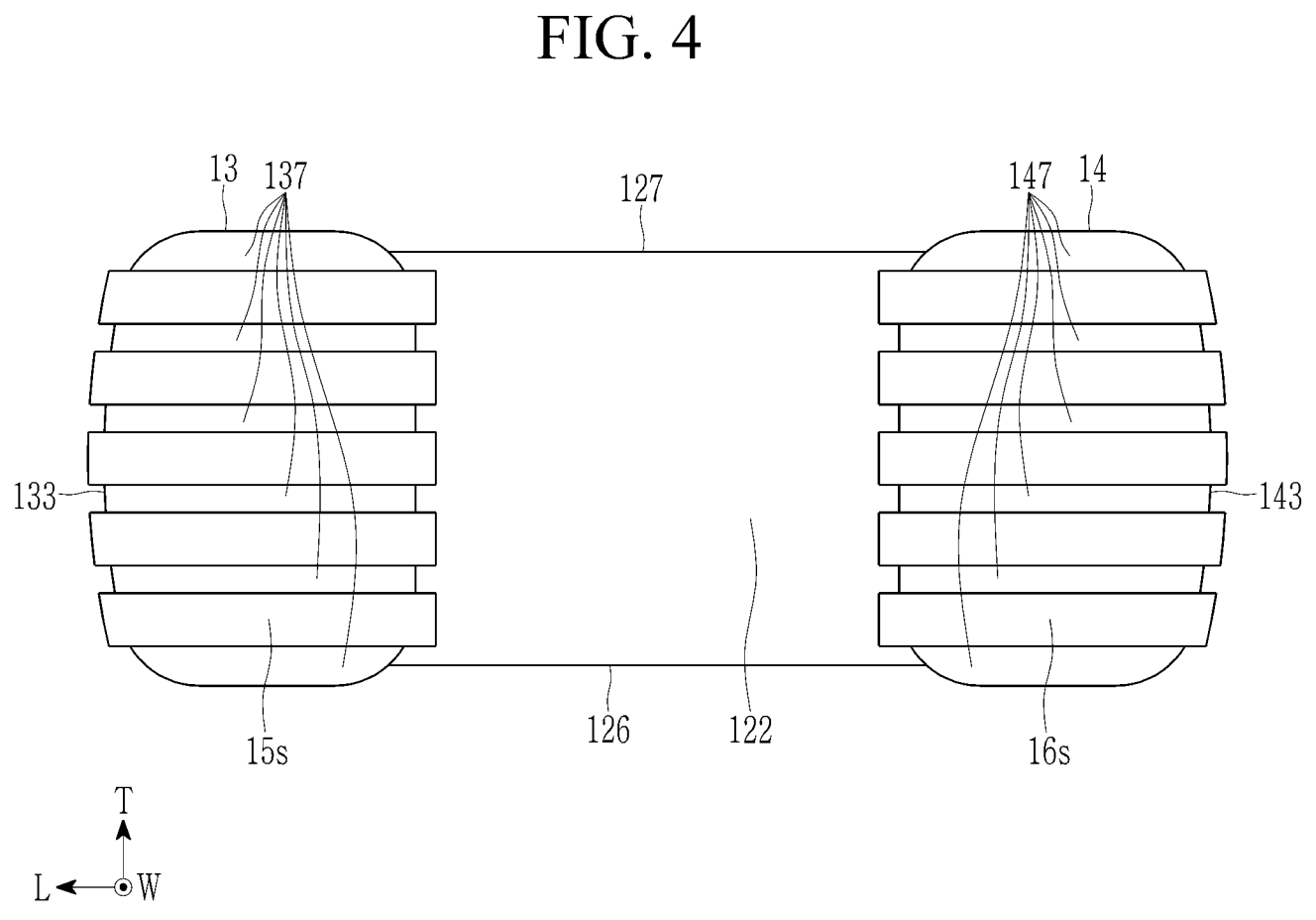
Figure 5:
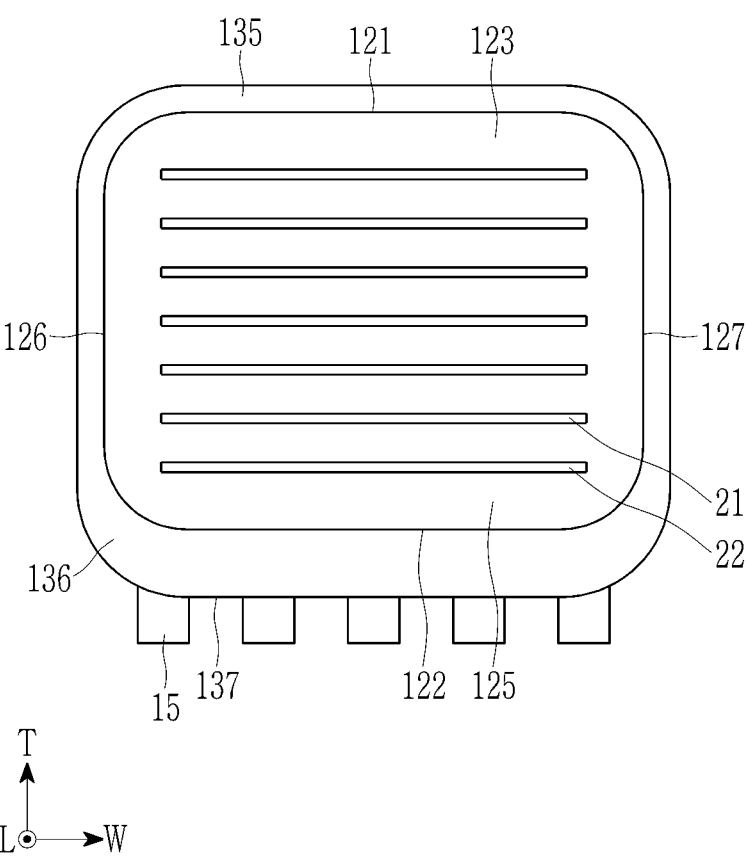
FIG. 5 is a cross-sectional view taken along line V-V' of FIG. 2.

FIG. 1 is a perspective view schematically illustrating a multilayer ceramic capacitor according to an embodiment, FIG. 2 is a bottom perspective view schematically illustrating the multilayer ceramic capacitor shown in FIG. 1, FIG. 3 is a cross-sectional view taken along line III-III' of FIG. 1, FIG. 4 is a bottom view schematically illustrating the multilayer ceramic capacitor shown in FIG. 1, and FIG. 5 is a cross-sectional view taken along line V-V' of FIG. 2.

Referring to FIGS. 1 to 5, a multilayer ceramic capacitor 10 according to the present embodiment includes a ceramic body 12, first and second external electrodes 13 and 14, a plurality of first and second internal electrodes 21 and 22, and first and second patterned electrodes 15 and 16.

The ceramic body 12 may be formed by stacking a plurality of dielectric layers 124 in a thickness direction T and then sintering the same. Here, each of the plurality of dielectric layers 124 adjacent to each other of the ceramic body 12 may be integrated with each other such that boundaries therebetween are not apparent. For example, adjacent dielectric layers 124 of the ceramic body 12 may be integrated such that boundaries therebtween may not be easily apparent without using a scanning electron microscope (SEM).

The ceramic body 12 may have a substantially hexahedral shape having a length, a width, and a thickness of preset sizes in directions intersecting each other, but the present disclosure is not limited thereto. For example, the ceramic body 12 has a substantially rectangular parallelepiped shape, but portions corresponding to corners or vertices may have a round shape.

In the present embodiment, for convenience of description, surfaces of the ceramic body 12 facing each other in a thickness direction T in which the dielectric layers 124 are stacked are defined as an upper surface 121 and a lower surface 122, surfaces of the ceramic body 12 facing each other in a length direction L respectively, connecting the upper surface 121 and the lower surface 122, are defined as first and second end surfaces 128 and 129, respectively, and surfaces facing each other in a width direction W vertically intersecting the first and second end surfaces 128 and 129 are defined as first and second side surfaces 126 and 127, respectively.

Meanwhile, first and second cover layers 123 and 125 may be disposed outwardly on both sides of the plurality of first and second internal electrodes 21 and 22, respectively, in the thickness direction T of the ceramic body 12 within the ceramic body 12.

That is, the first cover layer 123 having a predetermined thickness may be provided on an upper portion of the uppermost internal electrode, and the second cover layer 125 may be provided on a lower portion of the lowermost internal electrode within the ceramic body 12. The first cover layer 123 and the second cover layer 125 may have the same composition as that of the dielectric layer 124, and may be formed by stacking one or more dielectric layers not including an internal electrode on the upper portion of the uppermost internal electrode and the lower portion of the lowermost internal electrode in the ceramic body 12.

The first and second cover layers 123 and 125 may serve to prevent damage to the first and second internal electrodes 21 and 22 due to physical or chemical stress.

The dielectric layer 124 may include a ceramic material having a high permittivity. For example, the ceramic material may include a dielectric ceramic including components, such as $BaTiO_3$, $CaTiO_3$, $SrTiO_3$, or $CaZrO_3$. In addition, auxiliary components, such as a Mn compound, an Fe compound, a Cr compound, a Co compound, and a Ni compound, may be further included in these components. For example, the dielectric layer may include $(Ba_{1-x}Ca_x)$ $TiO_3$ $(0<x<1)$, $Ba(Ti_{1-y}Ca_y)O_3$ $(0<y<1)$, $(Ba_{1-x}Ca_x)(Ti_{1-y}Zr_y)$ $O_3$ (0<x<1, 0<y<1), or $Ba(Ti_{1-y}Zr_y)O_3$ (0<y<1) in which Ca, Zr, or the like is partially dissolved in $BaTiO_3$, but the present disclosure is not limited thereto.

In addition, at least one of ceramic additives, organic solvents, plasticizers, binders, and dispersants may be further included in the dielectric layer 124. The ceramic additive may include, for example, a transition metal oxide or carbide, a rare earth element, magnesium (Mg) or aluminum (Al).

For example, an average thickness of the dielectric layer 124 may be 0.5 μm to 10 μm, but the present disclosure is not limited thereto.

The first and second external electrodes 13 and 14 may be made of a conductive paste including a conductive metal. The first and second external electrodes may be formed, for example, by dipping a ceramic body into a conductive paste. The conductive metal may include nickel (Ni), copper (Cu), palladium (Pd), gold (Au), or alloys thereof, but the present disclosure is not limited thereto.

The first and second external electrodes 13 and 14 are disposed at both end portions of the ceramic body 12 in the length direction L, respectively, and include first and second body portions 133 and 143, first band portions 135 and 145, and second band portions 136 and 146, respectively.

The first body portion 133 may cover the first end surface 128 of the ceramic body 12 in the length direction L, and may be electrically connected to the exposed end portions of the internal electrodes 21 or 22.

The second body portion 143 may cover the second end surface 129 of the ceramic body 12 in the length direction L, and may be electrically connected to the exposed end portions of the internal electrodes 21 or 22.

The first band portions 135 and 145 may extend from the first and second body portions 133 and 143 in the length direction L of the ceramic body 12, respectively, and may cover portions of the upper surface 121 of the ceramic body 12 adjacent to both end portions of the ceramic body 12 and portions of the first and second side surfaces adjacent to both end portions of the ceramic body 12 respectively.

The second band portions 136 and 146 may extend from the first and second body portions 133 and 143 in the length direction L of the ceramic body 12, respectively, and may cover portions of the lower surface 122 of the ceramic body 12 adjacent to both end portions of the ceramic body 12 and portions of the first and second side surfaces 126 and 127 of the ceramic body 12 adjacent to both end portions of the ceramic body 12, respectively.

Each of the first and second external electrodes 13 and 14 may include nickel (Ni), copper (Cu), palladium (Pd), gold (Au), or alloys thereof. Meanwhile, the first and second external electrodes 13 and 14 may include a plurality of layers. For example, each of the first and second external electrodes 13 and 14 may include nickel (Ni), copper (Cu), nickel/copper (Ni/Cu), palladium/nickel (Pd/Ni), palladium/nickel/copper (Pd/Ni/Cu), or copper/nickel/copper (Cu/Ni/Cu) combinations.

In some embodiments, the outermost layer of each of the first and second external electrodes 13 and 14 may include tin (Sn). Since the tin (Sn) plating layer has a relatively low melting point, which may improve the ease of substrate mounting of the first and second external electrodes 13 and 14.

In general, the tin (Sn) plating layer may be coupled to an electrode pad on a substrate through solder including a tin (Sn)-copper (Cu)-silver (Ag) alloy paste. That is, the tin (Sn) plating layer may melt and bond with the solder during a heat treatment (reflow) process.

The plurality of first and second internal electrodes 21 and 22 are alternately stacked with the dielectric layer 124 interposed therebetween. The first and second internal electrodes 21 and 22 may be formed and stacked on a ceramic sheet forming the dielectric layer 124, and then alternately disposed with one dielectric layer 124 therebetween within the ceramic body 12 in the thickness direction through sintering. The first and second internal electrodes 21 and 22 may be electrodes having different polarities to each other, may be disposed to face each other in the stacking direction of the dielectric layer 124, and may be electrically insulated from each other by the dielectric layer 124 disposed therebetween.

The first and second internal electrodes 21 and 22 are disposed to be offset from each other in the length direction with the dielectric layer 124 interposed therebetween, and end portions thereof may contact with the first and second end surfaces 128 and 129 of the ceramic body 12 in the length direction, respectively. The end portions of the first and second internal electrodes 21 and 22 alternately contacted with the first and second end surfaces 128 and 129 of the ceramic body 12 in the length direction may be electrically connected to the first and second body portions 133 and 143 of the first and second external electrodes 13 and 14 at the first and second end surfaces 128 and 129 of the ceramic body 12 in the length direction. In addition, the first and second internal electrodes 21 and 22 may be formed of a conductive metal and may include, for example, nickel (Ni) or a nickel (Ni) alloy, but the present disclosure is not limited thereto.

According to the above configuration, when a predetermined voltage is applied to the first and second external electrodes 13 and 14, charges are accumulated between the first and second internal electrodes 21 and 22 facing each other. Here, capacitance of the multilayer ceramic capacitor 10 is proportional to an overlapping area of the first and second internal electrodes 21 and 22 overlapping each other in the stacking direction of the dielectric layer 124.

The first and second patterned electrodes 15 and 16 may partially cover a curved surface area where the first body portion 133 and the second band portion 136 meet and a curved surface area where the second body portion 143 and the second band portion 146 meet, respectively. That is, the first patterned electrode 15 may cover a portion of the outer circumferential surface of the second band portion 136 in the thickness direction T of the ceramic body 12, and the second patterned electrode 146 may cover a portion of the outer circumferential surface of the second band portion 146 in the thickness direction T of the ceramic body 12.

In other words, a portion of the outer circumferential surface of the second band portion 136 in the thickness direction T of the ceramic body 12 may be covered by the first patterned electrode 15, and the remaining portion may not be covered by the first patterned electrode 15 and may be exposed. Similarly, a portion of the outer circumferential surface of the second band portion 146 in the thickness direction T of the ceramic body 12 may be covered by the second patterned electrode 16, and the remaining portion may not be covered by the second patterned electrode 16 and is exposed. The patterned electrodes 15 and 16 covering the outer circumferential surfaces of the second band portions 136 and 146 are hereinafter referred to as band portion patterned electrodes 153 and 163, respectively.

Meanwhile, the first and second patterned electrodes 15 and 16 may cover portions of the first and second body portions 133 and 143 of the first and second external electrodes 13 and 14, respectively. That is, the first and second patterned electrodes 15 and 16 partially covering the outer circumferential surfaces of the second band portions 136 and 146 of the first and second external electrodes 13 and 14 may extend to the first and second body portions 133 and 143 to cover lower portions of the first and second body portions 133 and 143 in the thickness direction T of the ceramic body 12, respectively. The patterned electrodes 15 and 16 covering portions of the body portions 133 and 143 are hereinafter referred to as body portion patterned electrodes 155 and 165, respectively.

The first and second patterned electrodes 15 and 16 may include a conductive epoxy resin. The conductive epoxy resin may include a conductive metal, such as copper (Cu), tin (Sn), or silver (Ag), and an epoxy-based resin, but the present disclosure is not limited thereto.

Referring to FIGS. 1, 2, and 4, the first and second patterned electrodes 15 and 16 may include a plurality of stripe-shaped patterns 15s and 16s extending in the length direction L of the ceramic body 12, respectively. The plurality of stripe-shaped patterns 15s and 16s may have a uniform width in the width direction W of the ceramic body 12. The plurality of stripe-shaped patterns 15s and 16s may be arranged at regular intervals in the width direction W of the ceramic body 12. The first and second external electrodes 13 and 14 may have first exposed surfaces 137 and 147 between the plurality of stripe-shaped patterns 15s and 16s, respectively, in the length direction L of the ceramic body 12.

Figure 6:
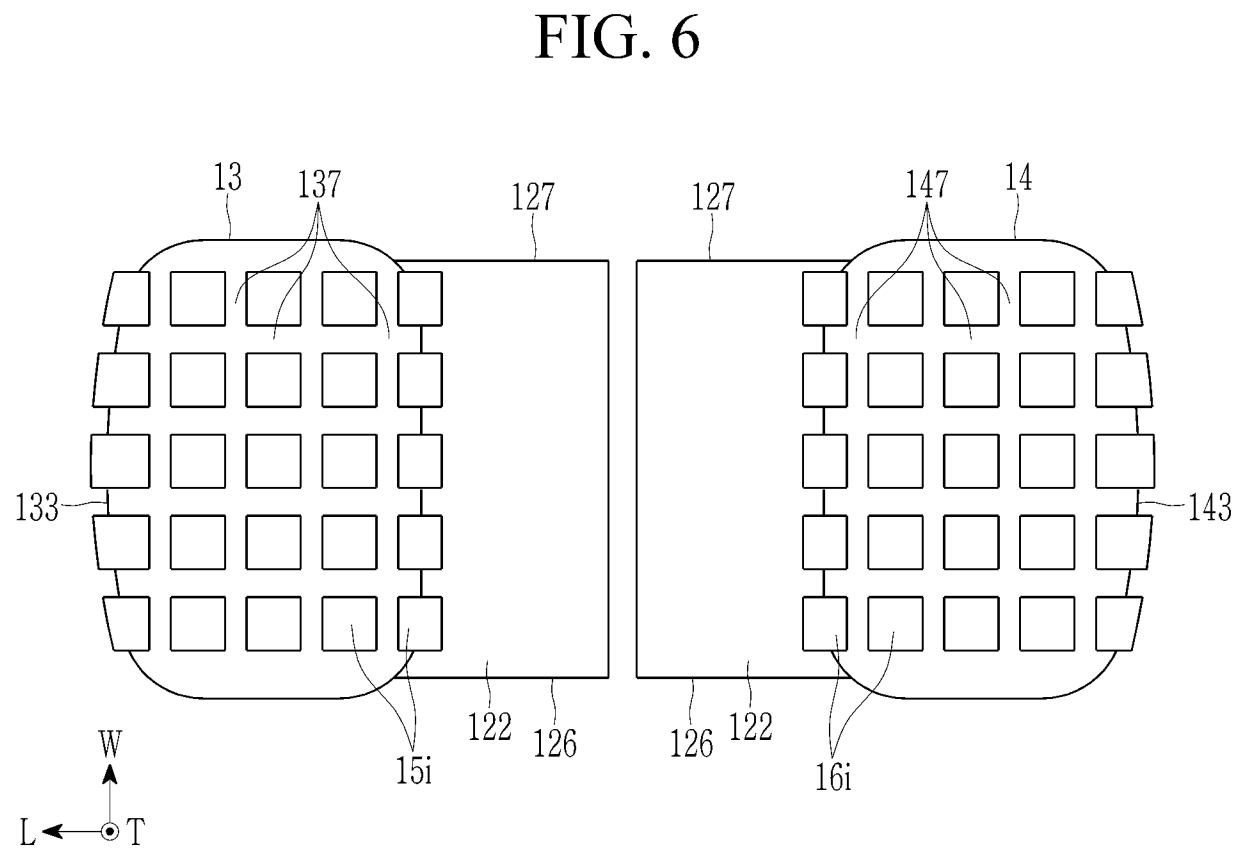

Meanwhile, FIG. 6 is a bottom view schematically illustrating a multilayer ceramic capacitor having patterned electrodes including island-shaped patterns.

Referring to FIG. 6, the first patterned electrode 15 may include a plurality of island-shaped patterns 15i spaced apart from each other. The plurality of island-shaped patterns 15i may have a polygonal shape. The first external electrode 13 may have the first exposed surfaces 137 between the plurality of island-shaped patterns 15i in the length direction L and the width direction W of the ceramic body 12.

Meanwhile, the second patterned electrode 16 may include a plurality of island-shaped patterns 16i spaced apart from each other. The plurality of island-shaped patterns 16i may have a polygonal shape. The second external electrode 13 may have the second exposed surfaces 147 between the plurality of island-shaped patterns 16i in the length direction L and the width direction W of the ceramic body 12.

However, the shapes of the first and second patterned electrodes 15 and 16 are not limited to the shapes described above, and may have various shapes as long as they satisfy the area condition to be described later. For example, the stripe-shaped pattern may be a curved pattern, rather than a straight pattern, and the island-shaped pattern may include patterns of various shapes, such as circular and elliptical patterns.

Here, a portion of the outer circumferential surface of the second band portion 136 exposed by the first patterned electrode 15 in the thickness direction T of the ceramic body 12 is referred to as a first exposed surface 137, and a portion of the outer circumferential surface of the second band portion 146 exposed by the second patterned electrode 16 in the thickness direction T of the ceramic body 12 is referred to as a second exposed surface 147.

Figure 7:
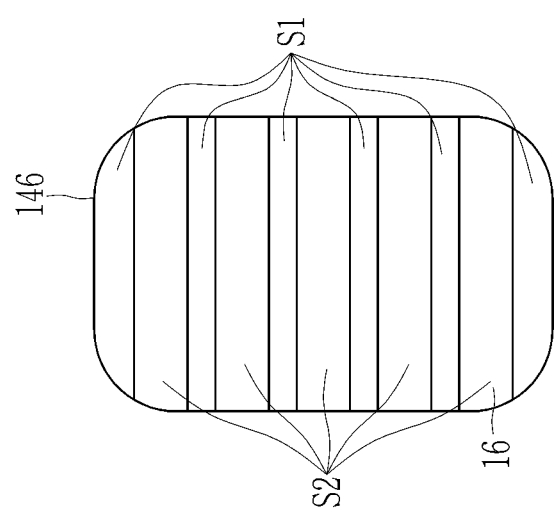
FIG. 7 is a diagram schematically illustrating an overlapping portion of the band portion of FIG. 4 and the patterned electrode, respectively.
Figure 7:
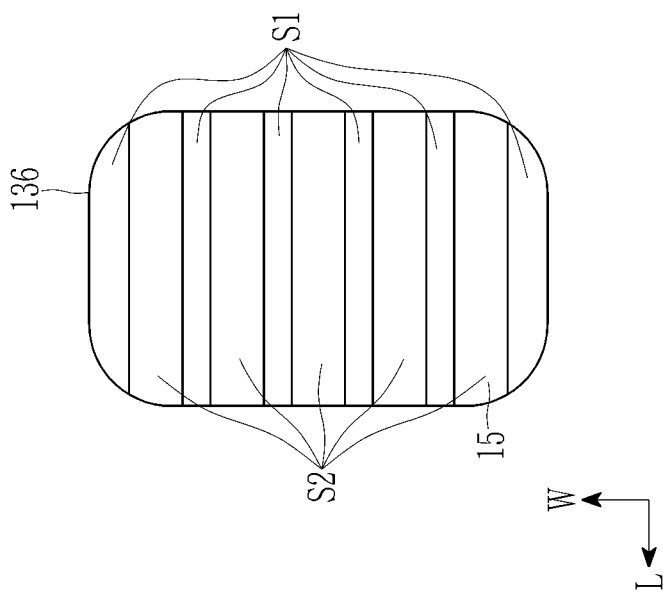

FIG. 7 is a diagram schematically illustrating an overlapping portion of the band portion and the patterned electrode of FIG. 4, respectively.

Referring to FIG. 7, a ratio of an area S1, which is a total area of the first exposed surface 137, to an area S2, which is a total area of the first patterned electrode 15 disposed on the second band portion 136 in the thickness direction T of the ceramic body 12, may be 1:2 or more and 1:4 or less, and a ratio of an area S1, which is a total area of the second exposed surface 147, to an area S2, which is a total area of the second patterned electrode 16 disposed on the second band portion 146 in the thickness direction T of the ceramic body, 12 may be 1:2 or more and 1:4 or less. That is, it may be $1:2 \leq S1:S2 \leq 1:4$. Here, a deviation of equivalent series inductance (ESL) is small, the surface roughness of the external electrodes is large, resulting in high adhesion strength, less delamination of the electrodes and less occurrence of flex cracks in the ceramic body, and the manufacturing costs may be low, compared to the case in which a conductive epoxy paste covers the entire outer circumferential surfaces of the band portions.

If S1:S2 is less than 1:2, the deviation of ESL may be small, the adhesion strength may be high, and the manufacturing cost may be advantageous, but there is a problem in that the frequency of occurrence of cracks in the ceramic body may be high.

If S1:S2 is greater than 1:4, the frequency of occurrence of cracks in the ceramic body may be low, but there are problems in that the deviation of ESL may be large, the occurrence of peel-off of external electrodes may be high, and the adhesion strength may be low.

Figure 8:
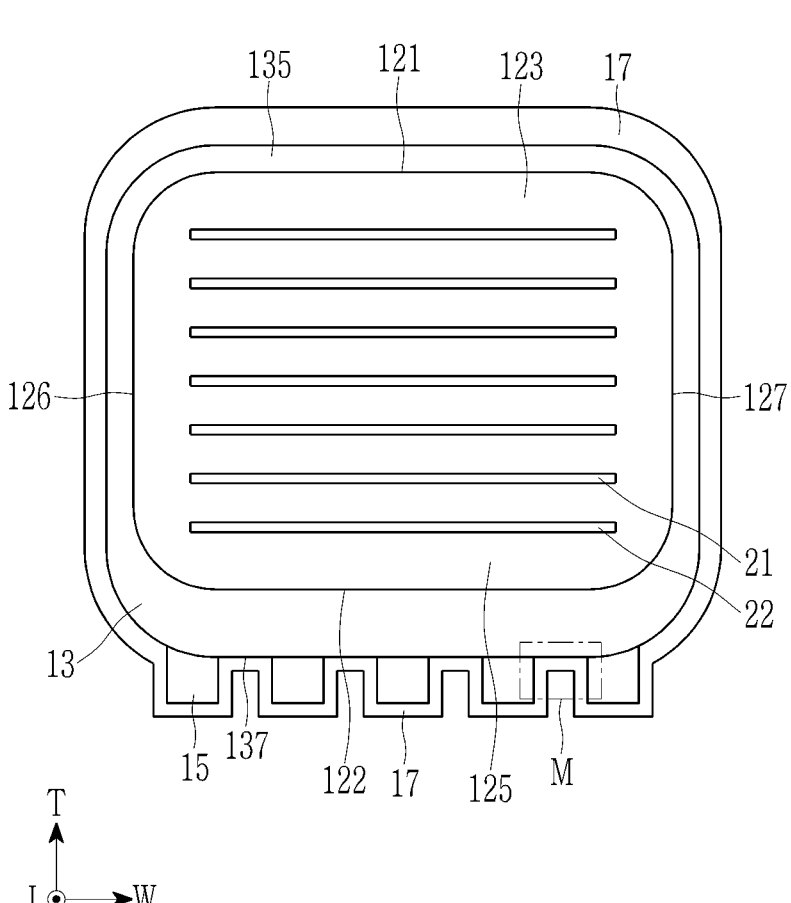
FIG. 8 is a schematic cross-sectional view illustrating the addition of a plating layer to the multilayer ceramic capacitor shown in FIG. 2.
Figure 9:
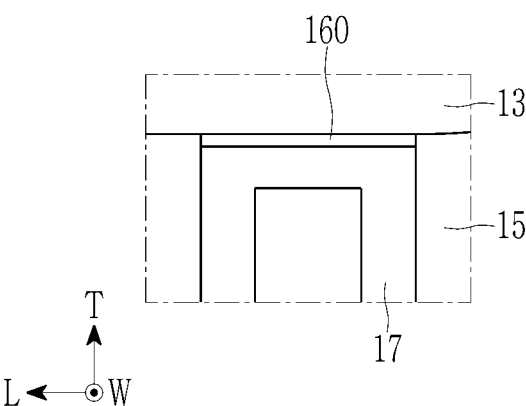
FIG. 9 is a partially enlarged view of dotted area M of FIG. 8.

FIG. 8 is a schematic cross-sectional view illustrating the addition of a plating layer 17 to the multilayer ceramic capacitor shown in FIG. 2, and FIG. 9 is a partially enlarged view of dotted area M of FIG. 8.

Referring to FIGS. 8 and 9, the multilayer ceramic capacitor may further include a plating layer 17 covering the first exposed surface 137 of the first external electrode 13 and the first patterned electrode 15. The plating layer may include nickel (Ni), tin (Sn), or silver (Ag), but the present disclosure is not limited thereto.

Meanwhile, an intermetallic compound (IMC) layer 160 may exist at an interface between the plating layer 17 and the first exposed surface 137. The IMC layer 160 may be formed from the combination of a component of the plating layer 17 (e.g., nickel (Ni) or tin (Sn)) with a component (e.g., copper (Cu)) of the first external electrode 13 during a heat treatment process after plating.

When the IMC layer 160 is formed at the interface between the plating layer 17 and the first external electrode 13, the bonding force between the plating layer 17 and the first external electrode 13 may be strengthened. Of course, an IMC layer may also exist at an interface between the plating layer 17 and the second exposed surface 147, and the resulting effect is the same.

Figure 10:
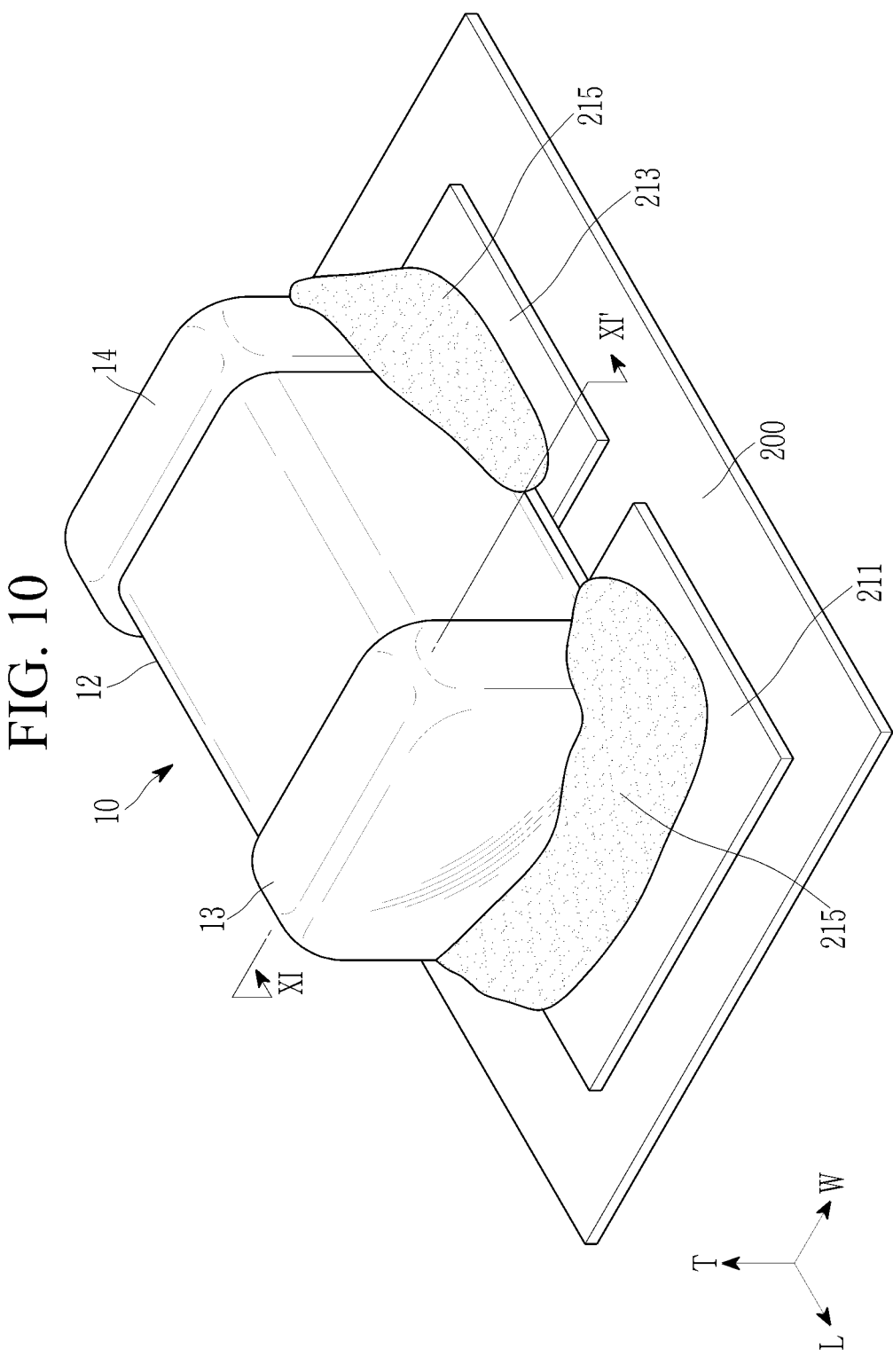
FIG. 10 is a schematic perspective view of the multilayer ceramic capacitor shown in FIG. 1 as mounted on a circuit board.
Figure 11:
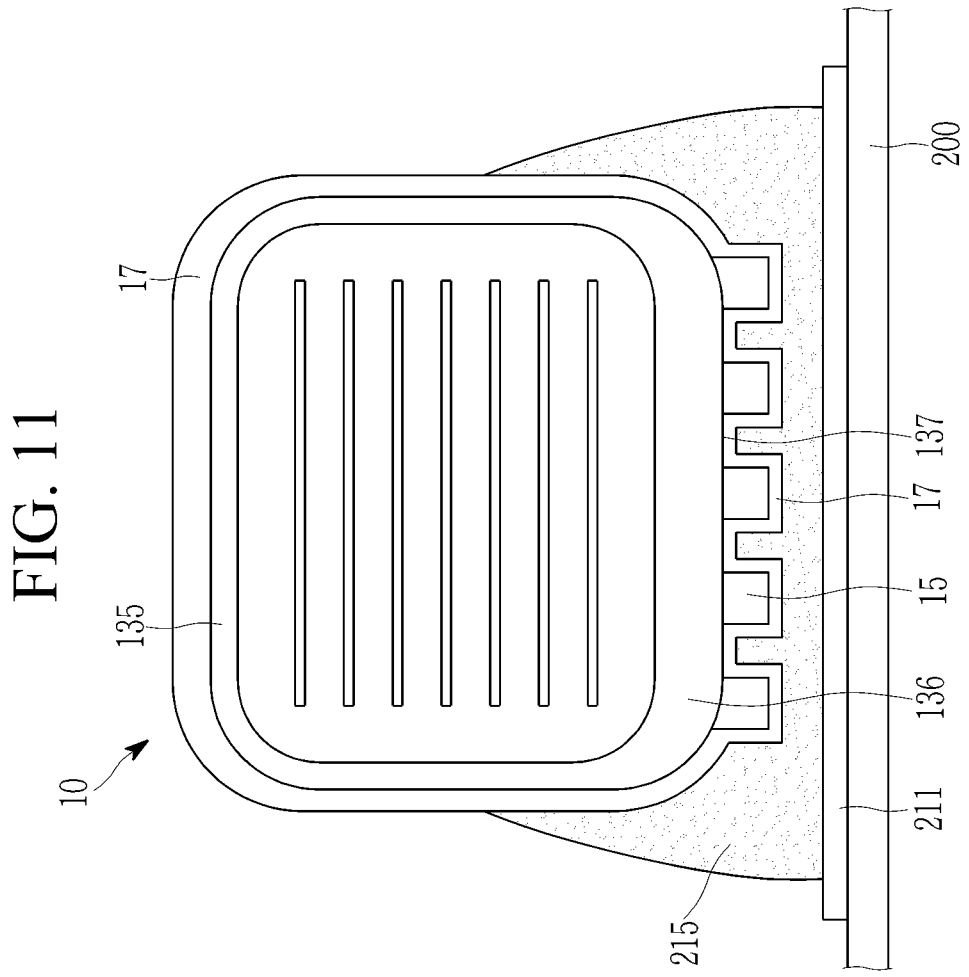
FIG. 11 is a cross-sectional view taken along line XI-XI' in FIG. 10.
Figure 11:
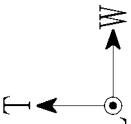

FIG. 10 is a schematic perspective view of the multilayer ceramic capacitor shown in FIG. 1 as mounted on a circuit board, and FIG. 11 is a cross-sectional view taken along line XI-XI' in FIG. 10.

Referring to FIGS. 10 and 11, the multilayer ceramic capacitor 10 is connected to the first and second electrode pads 211 and 213 provided on the upper surface of the circuit board 200 through a conductive bonding member 215. That is, the multilayer ceramic capacitor 10 may be mounted on the circuit board 200 through first and second electrode pads 211 and 213.

The first and second electrode pads 211 and 213 may be spaced apart from each other on an upper surface of the circuit board 200. When the band portions 136 and 146 of the first and second external electrodes 13 and 14 of the multilayer ceramic capacitor 10 are disposed to contact first and second electrode pads 211 and 213, the band portions 136 and 146 may be fixed to the circuit board 200 using a conductive bonding member 215. Meanwhile, the conductive bonding member 215 may also cover the first and second body portions 133 and 143 of the first and second external electrodes 13 and 14. Accordingly, the multilayer ceramic capacitor 10 may be electrically connected to the first and second electrode pads 211 and 213 of the circuit board 200. The conductive bonding member 215 may include, for example, solder.

In the present embodiment, the first and second external electrodes 13 and 14 of the multilayer ceramic capacitor 10 may be fixed to the first and second electrode pads 211 and 213, respectively, by the conductive bonding member 215, thereby being mounted on the circuit board 200.

According to the present embodiment, the first and second patterned electrodes 15 and 16 may cover portions of the second band portions 136 and 146 of the first and second external electrodes 13 and 14. Accordingly, the patterned electrodes 15 and 16 may protrude from the outer circumferential surface of the second band portions 136 and 146 of the external electrodes 13 and 14. As a result, irregularities may be formed on the surfaces of the external electrodes 13 and 14 to increase surface roughness, so that an anchoring effect may be strengthened. That is, the conductive bonding member 215 may penetrate into the space between the patterned electrodes 15 and 16 and the outer circumferential surfaces of the second band portions 136 and 146 and cure to form a strong bond. Therefore, according to the present embodiment, the bonding force between the external electrodes and the conductive bonding member may be strengthened, and the likelihood of peel-off of the electrodes may be reduced accordingly. Furthermore, the presence of the IMC layer 160 at the interface of the plating layer 17 and the first exposed surface 137 may strengthen the bonding force between the plating layer 17 and the first external electrode 13.

Hereinafter, specific embodiments of the present disclosure are presented. However, the embodiments described below are only intended to specifically illustrate or explain the disclosure, and the scope of the invention should not be limited thereto.

Manufacturing Example: Manufacturing of Multilayer Ceramic Capacitor

EXAMPLE

A paste including barium titanate ($BaTiO_3$) powder was applied on a carrier film and then dried to manufacture a plurality of dielectric green sheets.

A conductive paste including nickel (Ni) was screen-printed on the dielectric green sheet to form a conductive paste layer.

The plurality of dielectric green sheets were stacked and compressed, while overlapping at least a portion of the conductive paste layer, to manufacture a dielectric green sheet stack.

The dielectric green sheet stack was cut into individual chips, subjected to a binder burn out treatment, and then sintered to produce a capacitor body.

Next, a conductive paste including copper (Cu) and silver (Ag) as conductive metals was applied to an end surface of the capacitor body by a dipping method, dried, and then sintered to form external electrodes.

Subsequently, a paste including a conductive epoxy resin was printed on a lower outer circumferential surface of the band portion of the external electrode using a mask pattern, dried at 100° C. to 150° C., and then cured at 300° C. or less to form a patterned electrode. Here, the band portion of the external electrode included an exposed surface, which was a portion exposed by the patterned electrode, and the ratio of the area S1 of the exposed surface to the area S2 of the portion in which the patterned electrode overlaps the band portion in the thickness direction of the ceramic body was 1:2 or more and 1:4 or less.

Thereafter, a conductive metal was plated to cover the external electrode and the patterned electrode to produce a multilayer ceramic capacitor.

Comparative Example 1

Comparative Example 1 was the same as Example, except that an epoxy electrode was formed by printing a paste including a conductive epoxy resin to cover the entire lower outer circumferential surface of the band portion of the external electrode.

Comparative Example 2

Comparative Example 2 was the same as Example, except that the ratio of the area of the exposed surface to the area of the patterned electrode exceeded 1:4.

Comparative Example 3

Comparative Example 3 was the same as Example, except that the ratio of the area of the exposed surface to the area of the patterned electrode was less than 1:2.

Comparative Example 4

Comparative Example 4 was the same as Example, except that an epoxy electrode was formed by printing a paste including a conductive epoxy resin to cover a portion of the lower outer circumferential surface of the body portion of the external electrode and the entire lower outer circumferential surface of the band portion of the external electrode.

Comparative Example 5

Comparative Example 5 was the same as Example, except that the epoxy electrode was not formed on the external electrode.

Experimental Example: Equivalent Series Inductance of Multilayer Ceramic Capacitor After manufacturing 100 pieces of each of multilayer ceramic capacitors of Example and Comparative Examples 1 to 4, the deviation of equivalent series inductance (ESL) was measured, and the results are summarized in Table 1.

TABLE 1

| | S1:S2 | Deviation of ESL |
|---|---|---|
| Example | 1:2 or more and 1:4 or less | Within 3% |
| Comparative Example1 | Epoxy electrode covers the entire lower outer circumferential surfaces of the band portions of the external electrodes | Within 5% |
| Comparative Example2 | Exceeding 1:4 | Within 5% |
| Comparative Example3 | Less than 1:2 | Within 2% |
| Comparative Example4 | Epoxy electrode covers portions of the lower outer circumferential surfaces of the body portions of the external electrodes and the entire lower outer circumferential surfaces of the band portions | 10% or more |

Referring to Table 1, it can be seen that the multilayer ceramic capacitors prepared in Example and Comparative Example 3 have low ESL deviations within 3% and 2%, respectively, due to the formation of an IMC layer between the outer circumferential surface of the lower band portion of the external electrode and the plating layer. For the multilayer ceramic capacitors prepared in Comparative Examples 1 and 2, the ESL deviation was within 5%, because the epoxy electrode was formed only on the lower outer circumferential surface of the band portion of the external electrode. For the multilayer ceramic capacitor prepared in Comparative Example 4, the ESL deviation was 10% or more, which is due to the relatively large area covered by the epoxy electrode on the external electrode.

Experimental Example: Surface Roughness of Multilayer Ceramic Capacitor

After manufacturing 100 pieces of each of multilayer ceramic capacitors of Example and Comparative Examples 1 to 4, respectively, surface roughness Ra was measured, and the results are summarized in Table 2.

TABLE 2

| | S1:S2 | Ra |
|---|---|---|
| Example | 1:2 or more and 1:4 or less | 4 |
| Comparative Example1 | Epoxy electrode covers the entire lower outer circumferential surfaces of the band portions of the external electrodes | 0.7 |
| Comparative Example2 | Exceeding 1:4 | 1 |
| Comparative Example3 | Less than 1:2 | 1.6 |
| Comparative Example4 | Epoxy electrode covers portions of the lower outer circumferential surfaces of the body portions of the | 0.8 |

TABLE 2-continued

| | S1:S2 | Ra |
|---|---|---|
| | external electrodes and the entire lower outer circumferential surfaces of the band portions | |

Referring to Table 2, it can be seen that the multilayer ceramic capacitor manufactured in Example has a surface roughness of 4, which is relatively the largest, because the exposed surface of the lower band portion of the external electrode and the patterned electrode are dense. The surface roughness of the multilayer ceramic capacitors prepared in Comparative Examples 1, 2, and 4 were 0.7, 1, and 0.8, respectively, which are relatively small, because the outer circumference of the lower band portion of the external electrode was mostly covered by the epoxy electrode. The surface roughness of the multilayer ceramic capacitor manufactured in Comparative Example 3 was 1.6, which is relatively normal, because the area of the patterned electrode was small and the outer circumferential surface of the lower band portion of the external electrode was largely exposed.

Experimental Example: Bonding Strength of Multilayer Ceramic Capacitor

After manufacturing 100 pieces of each of multilayer ceramic capacitors of Example and Comparative Examples 1 to 4, respectively, adhesion strength was measured, and the results are summarized in Table 3.

TABLE 3

| | S1:S2 | adhesion |
|---|---|---|
| Example | 1:2 or more and 1:4 or less | 35N |
| Comparative Example 1 | Epoxy electrode covers the entire lower outer circumferential surfaces of the band portions of the external electrodes | 20N |
| Comparative Example 2 | Exceeding 1:4 | 25N |
| Comparative Example 3 | Less than 1:2 | 35N |
| Comparative Example 4 | Epoxy electrode covers portions of the lower outer circumferential surfaces of the body portion of the external electrodes and the entire lower outer circumferential surfaces of the band portions | 40N |

Referring to Table 3, it can be seen that the multilayer ceramic capacitor manufactured in Example has a high surface roughness and a relatively high adhesion strength (35N) due to the formation of an IMC layer between the outer circumferential surface of the lower band portion of the external electrode and the plating layer. The adhesion strength of the multilayer ceramic capacitor prepared in Comparative Example 1 is 20N, and the adhesion strength of the multilayer ceramic capacitor prepared in Comparative Example 2 is 25N, which are relatively low, because the external electrode is more easily peeled off than the epoxy electrode. The adhesion strength of the multilayer ceramic capacitor manufactured in Comparative Example 3 was 35 N, which is the same as that of the multilayer ceramic capacitor manufactured in Example, but many cracks occurred in the ceramic body. The adhesion strength of the multilayer ceramic capacitor prepared in Comparative Example 4 is relatively high as 40N, which is because the epoxy electrode covers a portion of the lower outer circumferential surface of the body portion of the external electrode and the lower outer circumferential surface of the band portion, so that the external electrode is not easily peeled off. Although conventional external electrodes have weak adhesion strength compared to epoxy electrodes, the multilayer ceramic capacitor manufactured in Example have the patterned electrodes including conductive epoxy resin, so that surface roughness is high, and since the IMC layer is formed between the outer circumferential surface of the lower band portion of the external electrode and the plating layer, the adhesion strength of the external electrode increases.

Experimental Example: Bending Strength of Multilayer Ceramic Capacitor

After manufacturing 100 pieces of each of multilayer ceramic capacitors of Example and Comparative Examples 1 to 4, respectively, bending strength was measured, and the results are summarized in Table 4.

TABLE 4

| | S1:S2 | Incidence of flex crack | Incidence of peel-off |
|---|---|---|---|
| Example | 1:2 or more and 1:4 or less | 3/50 | 7/50 |
| Comparative Example 1 | Epoxy electrode covers the entire lower outer circumferential surfaces of the band portions of the external electrodes | 3/50 | 15/50 |
| Comparative Example 2 | Exceeding 1:4 | 3/50 | 13/50 |
| Comparative Example 3 | Less than 1:2 | 10/50 | 5/50 |
| Comparative Example 4 | Epoxy electrode covers portions of the lower outer circumferential surfaces of the body portions of the external electrodes and the entire lower outer circumferential surfaces of the band portions | 12/50 | 0/50 |
| Comparative Example 5 | Epoxy electrode is not formed on the external electrode | 25/50 | 0/50 |

Referring to Table 4, the multilayer ceramic capacitor prepared in Example has a relatively low incidence of flex crack as 3/50, because the surface roughness is high and an anchoring effect increases, thereby increasing a cushioning effect. Furthermore, the area occupied by the patterned electrode including the epoxy resin is relatively large, which has a buffering effect. In addition, since the IMC layer is formed between the outer circumferential surface of the lower band portion of the external electrode and the plating layer, the incidence of peel-off is relatively low as 7/50. In general, as delamination occurs, stresses are relieved to prevent the occurrence of flex cracks. However, the multilayer ceramic capacitor manufactured in Example exhibits a low incidence of peel-off and a low incidence of flex crack. The multilayer ceramic capacitor prepared in Comparative Example 1 has a relatively low incidence of flex crack as 3/50, but the highest incidence of peel-off of 15/50, which is because a deformation stress acts only on a portion covered by a solder fillet during mounting on a board, so the epoxy electrode is easily peeled off. The multilayer ceramic capacitor prepared in Comparative Example 2 has an incidence of flex crack as 3/50 and an incidence of peel-off as 13/50, similar to Comparative Example 1. The multilayer ceramic capacitor prepared in Comparative Example 4 has an incidence of flex crack as 12/50 and an incidence of peel-off as 0/50. This is because the epoxy electrode covers a portion of the lower outer circumferential surface of the body portion of the external electrode and the lower outer circumferential surface of the band portion, so that peel-off occurs less, while flex crack easily occurs. The multilayer ceramic capacitor prepared in Comparative Example 5 has an incidence of flex crack as 25/50 and an incidence of peel-off as 0/50, which is because flex crack occurs more easily due to the lack of an epoxy electrode having a buffering effect.

Although the embodiment of the present disclosure has been described above, the present disclosure is not limited thereto, and it is possible to carry out various modifications within the claim coverage, the description of the invention, and the accompanying drawings, and such modifications also fall within the scope of the present disclosure.

DESCRIPTION OF SYMBOLS

10: multilayer ceramic capacitor
12: ceramic body
13: first external electrode
14: second external electrode
17: plating layer
15: first patterned electrode
16: second patterned electrode
153, 163: band portion patterned electrode
155, 165: body portion patterned electrode
15s, 16s: stripe shape pattern
15i, 16i: island shape pattern
121: upper surface
122: lower surface
21, 22: internal electrode
123: first cover layer
124: dielectric layer
125: second cover layer
126: first side surface
127: second side surface
133: first body portion
143: second body portion
135, 145: first band portion
136, 146: second band portion
128: first end surface
129: second end surface
137: first exposed surface
147: second exposed surface
160: intermetallic compound layer
200: circuit board
211: first electrode pad 213: second electrode pad 215: conductive bonding member

What is claimed is:

1. A multilayer ceramic capacitor comprising:

a ceramic body including first and second end surfaces facing to each other in a length direction, first and second side surfaces facing to each other in a width direction, upper and lower surfaces facing to each other in a thickness direction having a preset size of length, width, and thickness;

first and second external electrodes disposed on the ceramic body and respectively including: first and second body portions covering both the first and second end surfaces of the ceramic body and spaced apart from each other in the length direction of the ceramic body; and first and second band portions extending from the body portions and covering both the first and second side surfaces of the ceramic body in the width direction and both the upper and lower surfaces of the ceramic body in the thickness direction;

a plurality of first and second internal electrodes alternately disposed in a thickness direction with a dielectric layer interposed therebetween, connected to the first and second end surfaces of the ceramic body, respectively, and connected to the first and second external electrodes, respectively; and first and second patterned electrodes respectively partially covering the first and second band portions on the upper surface or lower surface of the ceramic body in the thickness direction and partially covering first and second body portions, wherein the first and second patterned electrodes include:

a plurality of island-shaped patterns having a polygonal shape disposed on each of the first and second band portions; or a plurality of striped-shaped patterns that arranged at regular intervals in the width direction disposed on each of the first and second band portions, the first and second band portions on the upper surface or lower surface of the ceramic body in the thickness direction include an exposed surface on which the first and second patterned electrodes is not disposed, and a ratio of a total area of the exposed surface to a total area of the first and second patterned electrodes disposed on the first and second band portions on the upper surface or lower surface of the ceramic body in the thickness direction is 1:2 or more and 1:4 or less.

2. The multilayer ceramic capacitor of claim 1, wherein:

the plurality of stripe-shaped patterns extends in the length direction of the ceramic body.

3. The multilayer ceramic capacitor of claim 1, wherein:

the plurality of stripe-shaped pattern has a uniform width in the width direction of the ceramic body.

4. The multilayer ceramic capacitor of claim 1, further comprising:

a plating layer covering both the exposed surface and the patterned electrode, wherein an intermetallic compound (IMC) layer is included between the plating layer and the exposed surface.

5. The multilayer ceramic capacitor of claim 1, wherein:

the first and second patterned electrodes include a conductive epoxy resin.

6. The multilayer ceramic capacitor of claim 5, wherein:

the conductive epoxy resin includes copper (Cu), tin (Sn), or silver (Ag) in addition to an epoxy-based resin.

7. The multilayer ceramic capacitor of claim 5, wherein:

the conductive epoxy resin includes tin (Sn) in addition to an epoxy-based resin.

* * * * *